US011914500B2

(12) United States Patent
Fishel et al.

(10) Patent No.: US 11,914,500 B2
(45) Date of Patent: Feb. 27, 2024

(54) DEBUGGING OF ACCELERATOR CIRCUIT FOR MATHEMATICAL OPERATIONS USING PACKET LIMIT BREAKPOINT

(71) Applicant: Apple Inc., Cupertino, CA (US)

(72) Inventors: Liran Fishel, Raanana (IL); Danny Gal, Hod-Hasharon (IL); Nir Nissan, Atlit (IL)

(73) Assignee: APPLE INC., Cupertino, CA (US)

( * ) Notice: Subject to any disclaimer, the term of this patent is extended or adjusted under 35 U.S.C. 154(b) by 90 days.

(21) Appl. No.: 17/591,888

(22) Filed: Feb. 3, 2022

(65) Prior Publication Data
US 2023/0281106 A1    Sep. 7, 2023

(51) Int. Cl.
| | |
|---|---|
| *G06F 9/48* | (2006.01) |
| *G06F 11/36* | (2006.01) |
| *G06F 11/00* | (2006.01) |
| *G06F 9/44* | (2018.01) |
| *G06F 9/46* | (2006.01) |
| *G06F 9/32* | (2018.01) |
| *G06F 9/30* | (2018.01) |

(52) U.S. Cl.
CPC ........ *G06F 11/3636* (2013.01); *G06F 9/3004* (2013.01); *G06F 9/30036* (2013.01); *G06F 9/30145* (2013.01); *G06F 9/321* (2013.01); *G06F 11/3656* (2013.01)

(58) Field of Classification Search
CPC .. G06F 11/277; G06F 11/3648; G06F 30/331; G06F 11/3664; G06F 11/3628; G06F 11/3636; G06F 9/30036; G06F 9/3004; G06F 9/30145; G06F 9/321; G06F 11/3656
See application file for complete search history.

(56) References Cited

U.S. PATENT DOCUMENTS

| | | | |
|---|---|---|---|
| 6,446,221 B1 | 9/2002 | Jaggar et al. | |
| 6,834,364 B2 * | 12/2004 | Krech, Jr. .............. | G11C 29/56 714/45 |
| 10,558,599 B2 | 2/2020 | Staudenmaier et al. | |
| 11,042,468 B2 | 6/2021 | Zbiciak et al. | |
| 2017/0060579 A1 | 3/2017 | Vincent et al. | |

OTHER PUBLICATIONS

Mathew et al., Scalable Coding Of Motion and Depth Fields With Shared Breakpoints, 5 pages (Year: 2021).*

* cited by examiner

*Primary Examiner* — Thuy Dao
(74) *Attorney, Agent, or Firm* — Sterne, Kessler, Goldstein & Fox P.L.L.C.

(57) ABSTRACT

Embodiments of the present disclosure relate to debugging of an accelerator circuit using a packet limit breakpoint. A vector circuit reads a subset of instruction packets from an instruction memory and receives a portion of input data from a data memory corresponding to the subset of instruction packets. The vector circuit executes a set of vector operations in accordance with multiple instruction packets from the subset using data from the received portion of input data identified in the multiple instruction packets to generate output data. A program counter control circuit coupled to the instruction memory triggers a breakpoint in a program stored in the instruction memory causing the accelerator circuit to stop executing remaining instruction packets in the program following the multiple instruction packets responsive to a number of instruction packets executed in the program from a time instant of an event reaching a predetermined number.

20 Claims, 5 Drawing Sheets

DEBUGGING OF ACCELERATOR CIRCUIT FOR MATHEMATICAL OPERATIONS USING PACKET LIMIT BREAKPOINT

BACKGROUND

1. Field of the Disclosure

The present disclosure relates to a circuit for performing mathematical operations, and more specifically to debugging of an accelerator circuit for mathematical operations using a packet limit breakpoint.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to debugging of an accelerator circuit (e.g., linear algebra accelerator circuit) for performing mathematical operations (e.g., linear algebra operations) using a packet limit breakpoint. The accelerator circuit includes, among other components, an instruction memory storing a program with multiple instruction packets, a program counter control circuit coupled to the instruction memory, a data memory storing input data, a vector circuit coupled to the instruction memory and the data memory, and a scalar circuit coupled to the instruction memory and the data memory. The vector circuit may read a subset of the instruction packets from the instruction memory. The vector circuit may further receive a portion of the input data from the data memory corresponding to the subset of instruction packets. The vector circuit may perform a set of vector operations in accordance with instruction packets from the subset using data from the received portion of input data identified in the instruction packets from the subset to generate output data. The program counter control circuit triggers a breakpoint in the program causing the accelerator circuit to stop executing remaining instruction packets in the program responsive to a number of instruction packets executed in the program from a time instant of an event at the accelerator circuit reaching a predetermined number.

BRIEF DESCRIPTION OF THE DRAWINGS

Figure (FIG.) 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to debugging of an accelerator circuit (e.g., linear algebra accelerator circuit) using a packet limit breakpoint. The accelerator circuit may be configured for performing various mathematical operations (e.g., linear algebra operations). The accelerator circuit may include an instruction memory storing a program with a list of instruction packets. Each instruction packet may include a respective packet of multiple individual instructions that can be read and executed in parallel at one or more components of the accelerator circuit. The accelerator circuit may further include, among other components, a program counter control circuit coupled to the instruction memory, a data memory storing input data, a vector circuit coupled to the instruction memory and the data memory, and a scalar circuit coupled to the instruction memory and the data memory. The vector circuit may read a subset of the instruction packets from the instruction memory. The vector circuit may further receive a portion of the input data from the data memory corresponding to the subset of instruction packets. The vector circuit may perform a set of vector operations in accordance with multiple instruction packets from the subset using data from the received portion of input data identified in the instruction packets from the subset to generate output data. The program counter control circuit may trigger a breakpoint in the program causing the accelerator circuit to stop executing remaining instruction packets in the program responsive to a number of instruction packets executed in the program from a time instant of an event at the accelerator circuit reaching a predetermined number.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
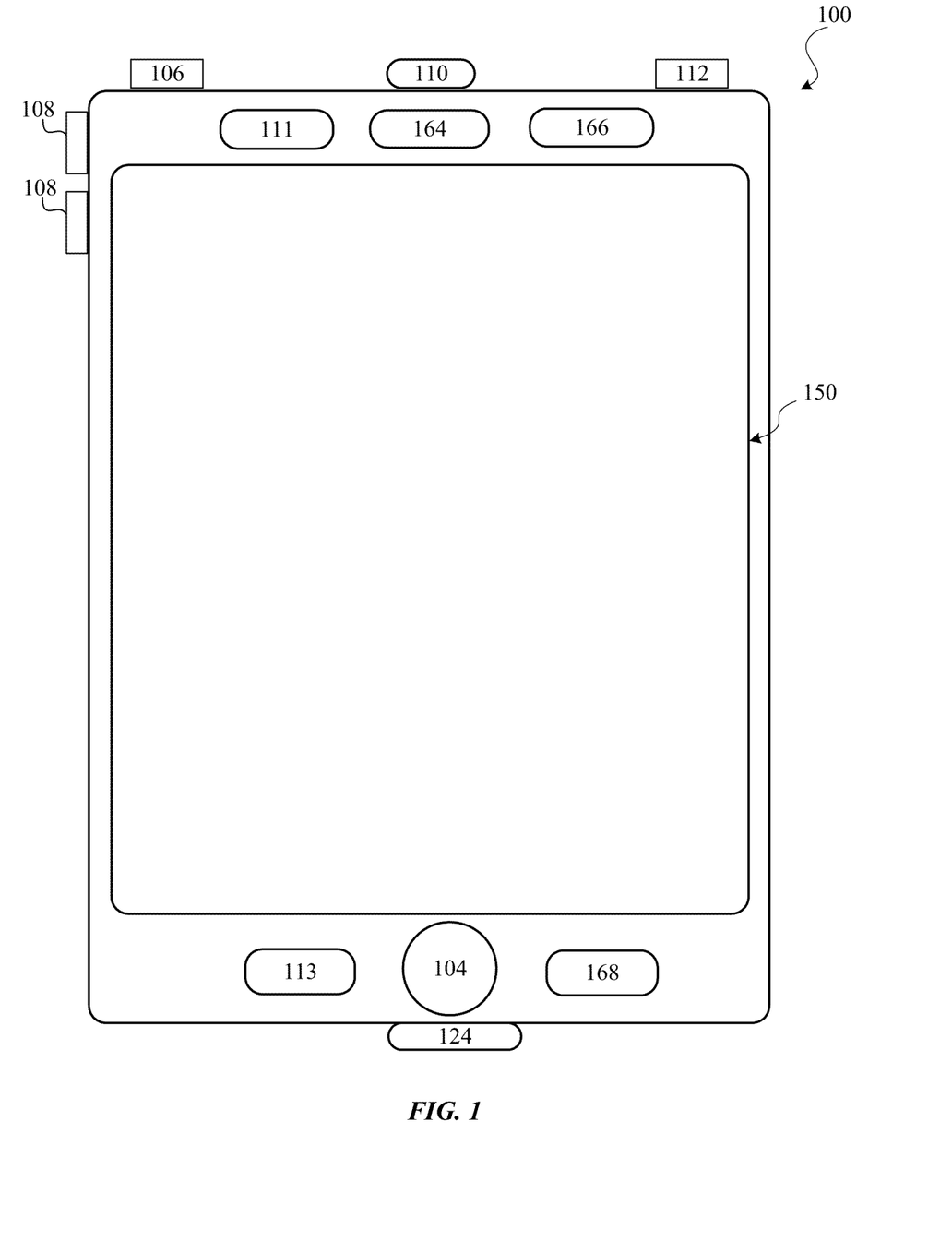

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
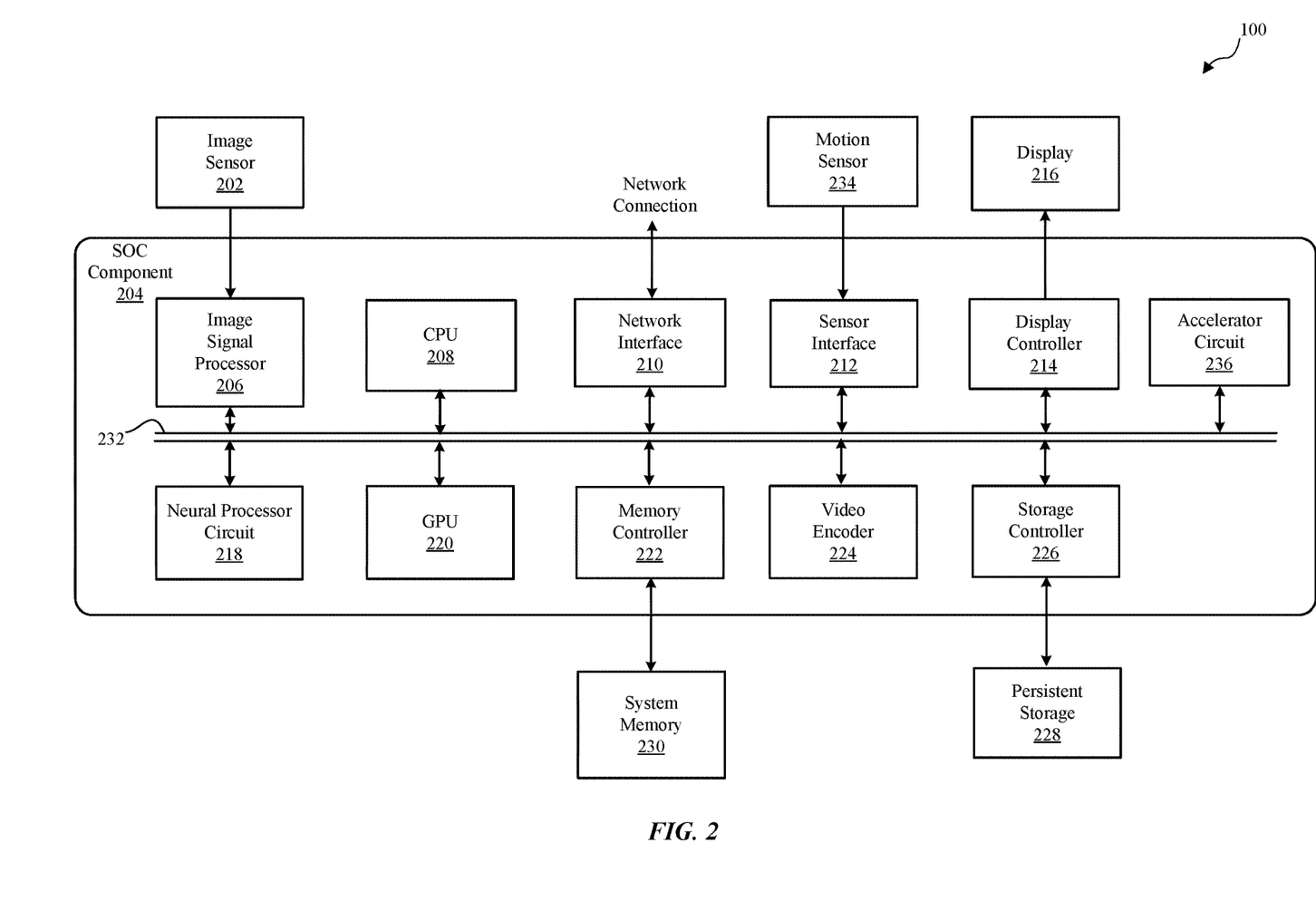
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, a sensor interface 212, a display controller 214, a neural processor circuit 218, a graphics processing unit (GPU) 220, a memory controller 222, a video encoder 224, a storage controller 226, accelerator circuit 236, and a bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, ISP 206, persistent storage 228, system memory 230 or other sources such as network interface 210 or GPU 220. The output of neural processor circuit 218 may be provided to various components of device 100 such as ISP 206, system memory 230, CPU 208 or accelerator circuit 236 for various operations.

Accelerator circuit 236 is a circuit that performs various mathematical operations (e.g., linear algebra operations) based on computation including multiplication, division, addition, subtraction, square root operation, accumulation, or some other mathematical operations. Such computation may be arranged to perform, for example, various types of vector operations such as vector addition, vector subtraction, vector multiplication, and vector scaling. Accelerator circuit 236 may be implemented as, e.g., a linear algebra accelerator circuit for accelerating linear algebra operations or a vector processor for accelerating various operations on elements of vectors. As used herein, the term "vector" is defined broadly to include one-dimensional arrays, two-dimensional arrays (i.e., matrices) and arrays having more than two dimensions (i.e., tensors). Accelerator circuit 236 is a configurable circuit that performs operations in a fast and power-efficient manner while relieving CPU 208 of resource-intensive operations (e.g., linear algebra operations). Accelerator circuit 236 may be configured as a single instruction multiple data (SIMD) processor. Accelerator circuit 236 may receive the input data from sensor interface 212, ISP 206, persistent storage 228, system memory 230, neural processor circuit 218 or other sources such as network interface 210 or GPU 220. The output of accelerator circuit 236 may be provided to various components of device 100 such as ISP 206, system memory 230, CPU 208 and/or neural processor circuit 218 for various operations. In some embodiments, instead of being a stand-alone circuit, accelerator circuit 236 is integrated into ISP 206, neural processor circuit 218 or some other component of device 100. The structure and operations of accelerator circuit 236 will be discussed in further detail below with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to ISP 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208, GPU 220 or accelerator circuit 236. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, ISP 206, and accelerator circuit 236. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Example Accelerator Circuit

Figure 3:
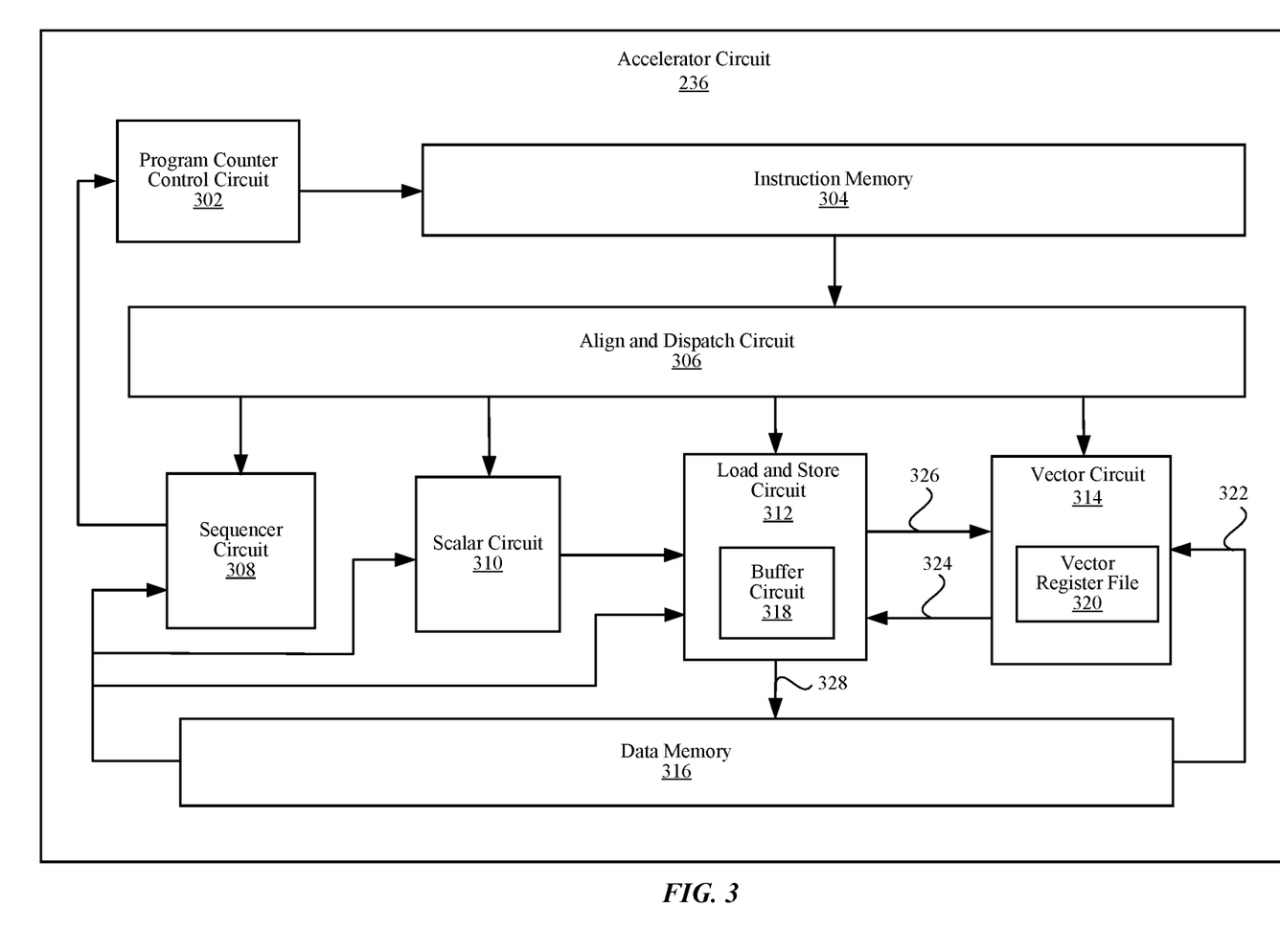
FIG. 3 is a block diagram illustrating an accelerator circuit for mathematical operations, according to one embodiment.

FIG. 3 is a block diagram illustrating an example accelerator circuit 236, according to one embodiment. Accelerator circuit 236 includes a program counter control circuit 302, an instruction memory 304, an align and dispatch circuit 306, a sequencer circuit 308, a scalar circuit 310, a load and store circuit 312, a vector circuit 314 with a vector register file 320, and a data memory 316. Accelerator circuit 236 may include fewer or additional components not illustrated in FIG. 3.

Program counter control circuit 302 controls a program counter register pointing to an instruction packet in instruction memory 304 that is next for execution in a pipeline of accelerator circuit 236. An instruction packet may include a set of instructions that can be stored at a same address in instruction memory 304. Once an instruction packet is read from instruction memory 304, some or all of the instructions from the instruction packet may be executed in parallel by one or more components of accelerator circuit 236. Program counter control circuit 302 may also trigger a breakpoint in a series of instructions (e.g., program) in instruction memory that are being executed at one or more components of accelerator circuit 236, e.g., for debugging of accelerator circuit 236. The structure and operation of program counter control circuit 302 in relation to triggering the breakpoint will be discussed in further detail below with reference to FIG. 4.

Align and dispatch circuit 306 receives an instruction packet from instruction memory 304. Align and dispatch circuit 306 may identify the received instruction packet and align the received instruction packet for dispatching individual instructions within the instruction packet to one or more components of accelerator circuit 236 (e.g., sequencer circuit 308, scalar circuit 310, load and store circuit 312, and/or vector circuit 314).

Sequencer circuit 308 manages a pipeline progress of instructions within accelerator circuit 236, an operation of program counter control circuit 302, instruction branches, access of instruction memory 304, and decoding of an instruction packet read from instruction memory 304.

Scalar circuit 310 may provide single integer execution pipeline including arithmetic, logic and bit manipulation operations. Scalar circuit 310 may further provide one or two stage execution for short latencies between sequential instructions. Scalar circuit 310 may also provide conditional execution for all instructions executed at scalar circuit 310.

Load and store circuit 312 may load data from data memory 316, and store data (e.g., data generated by scalar circuit 310 and/or vector circuit 314) back to data memory 316. Load and store circuit 312 may include a store buffer 318 for data storage, which increases store throughput and minimizes contention with data loads from data memory 316.

Data memory 316 stores input data received from, e.g., sensor interface 212, ISP 206, persistent storage 228, system memory 230, neural processor circuit 218 or other sources such as network interface 210 or GPU 220. Data memory 316 further stores data that are saved in buffer circuit 318 previously generated by, e.g., scalar circuit 310 and/or vector circuit 314.

Vector circuit 314 may perform mathematical operations (e.g., linear algebra operations) on elements of vectors, e.g., as part of linear filtering. The mathematical operations performed at vector circuit 314 may include, e.g., multiply-accumulate operations, division operations, scaling operations, subtraction operations, square root operations, some other mathematical operation, or combination thereof. Each operation performed at vector circuit 314 may be performed in accordance with a corresponding instruction read from instruction memory 304 and decoded at vector circuit 314. Each operation performed at vector circuit 314 is broadly referred to herein as "vector operation", and includes any operation (e.g., linear algebra operation) performed on one or more elements of one or more vectors.

Vector circuit 314 may read a subset of the instruction packets from instruction memory 304. Each of the instruction packets may include a respective packet of instructions that may be executed in parallel at one or more components of accelerator circuit 236 (e.g., at vector circuit 314 and/or scalar circuit 310). Vector circuit 314 may further receive (e.g., at vector register file 320) a portion of input data 322 from data memory 316 as identified in instructions of the subset of instruction packets read from instruction memory 304. Vector circuit 314 may perform a set of vector operations in accordance with multiple instruction packets from the subset using data from received portion of input data 322 identified in the instruction packets from the subset in order to generate output data 324.

Output data 324 generated by vector circuit 314 may be stored in buffer circuit 318 within load and store circuit 312. Output data 324 may be stored in buffer circuit 318 together with other output data 324 previously generated at vector circuit 314. At some predetermined operational cycle (e.g., clock cycle) of accelerator circuit 236, at least a portion of output data 324 stored in buffer circuit 318 may be passed as input data 326 back into vector circuit 314 for further processing. Additionally or alternatively, output data 324 stored in buffer circuit 318 may be written into data memory 316 as output data 328. In one or more embodiments, at least a portion of output data 324 generated by each vector operation at vector circuit 314 may be stored at vector register file 320 for further processing at vector circuit 314.

Example Debugging of Accelerator Circuit

Figure 4:
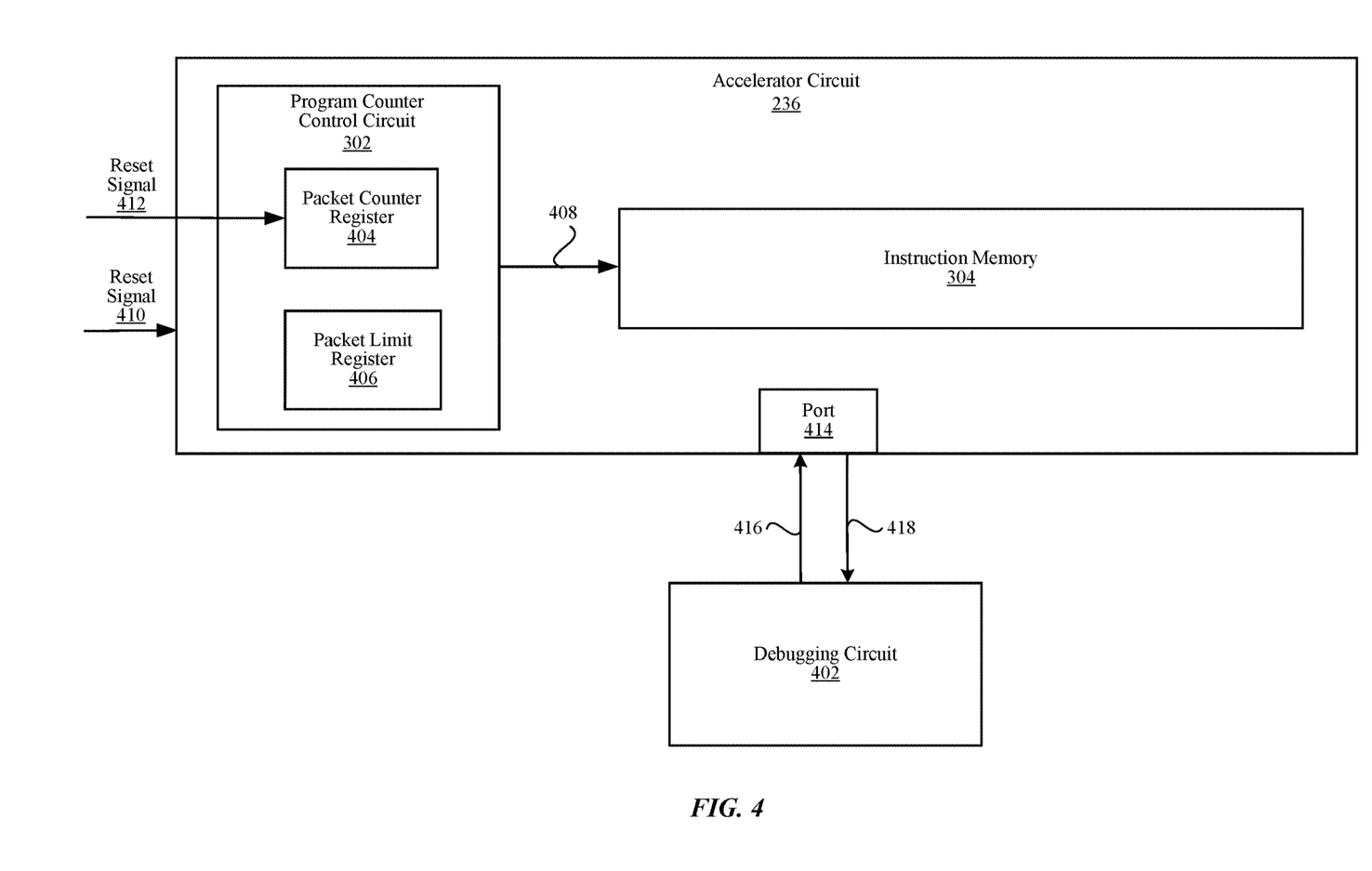
FIG. 4 is a block diagram illustrating a debugging circuit coupled to an accelerator circuit, according to one embodiment.

FIG. 4 is a block diagram illustrating a debugging circuit 402 coupled to accelerator circuit 236, according to one embodiment. FIG. 4 illustrates a pertinent portion of accelerator circuit 236 that includes program counter control circuit 302 and instruction memory 304. Program counter control circuit 302 may include a packet count register 404 and a packet limit register 406. Program counter control circuit 302 may include additional components not illustrated in FIG. 4. Based on a packet count in packet count register 404, program counter control circuit 302 generates a pointer 408 pointing to an instruction packet in instruction memory 304 that is next for reading from instruction memory and execution at one or more components of accelerator circuit 236 (e.g., at vector circuit 314 and/or scalar circuit 310).

Packet limit register 406 may store an indication of a number of instruction packets that, when executed at the one or more components of accelerator circuit 236, would trigger a debugging of a current state of accelerator circuit 236. Program counter control circuit 302 or some other component of accelerator circuit 236 (e.g., sequencer circuit 308 in FIG. 3) may configure packet limit register 406 with a predetermined number of instruction packets that triggers the debugging of accelerator circuit 236.

Program counter control circuit 302 may trigger a breakpoint in the currently executed program stored in instruction memory 304. The triggered breakpoint may cause one or more components of accelerator circuit 236 (e.g., vector circuit 314 and/or scalar circuit 310) to stop executing remaining instruction packets in the program following the instruction packets in the subset that have already been executed responsive to a number of instruction packets executed in the program from a time instant of an event that occurred at accelerator circuit 236 reaching a predetermined number.

In one embodiment, the event occurring at accelerator circuit 236 is a software reset of accelerator circuit 236. The software reset may be based on a reset signal 410 applied to accelerator circuit 236 at a particular operational cycle of accelerator circuit 236. The software reset may be implemented as a reset of program counter control circuit 302. Responsive to the number of instruction packets executed after the software reset (e.g., from a time instant of assessing reset signal 410) being equal to a number of instruction packets indicated in packet limit register 406, program counter control circuit 302 may trigger the breakpoint in the program that is being executed, e.g., for debugging of a current state of accelerator circuit 236.

In another embodiment, the event at accelerator circuit 236 is a reset of packet count register 404. The reset of packet count register 404 may be based on a reset signal 412 applied to packet count register 404 at a particular operational cycle of accelerator circuit 236. In response to assessing reset signal 412 and resetting of packet counter register 404, pointer 408 may be updated to point into an instruction packet in instruction memory 304 that is a first for execution in the program. Responsive to the number of instruction packets executed after the reset of packet count register 404 (e.g., from a time instant of assessing reset signal 412) being equal to a number of instruction packets indicated in packet limit register 406, program counter control circuit 302 may trigger the breakpoint in the program that is being executed, e.g., for debugging of accelerator circuit 236.

Responsive to triggering the breakpoint in the program, debugging circuit 402 may perform a debugging of a current state of accelerator circuit 236. Debugging circuit 402 may be coupled to accelerator circuit 236 via a port 414 that can be implemented as, e.g., an advanced extensible interface (AXI) slave port. Debugging circuit 402 may send, via port 414, one or more probe signals 416 into accelerator circuit 236 initiating evaluation of a state of accelerator circuit 236. The state of accelerator circuit 236 may be evaluated by evaluating, e.g., states of specific register files in one or more components of accelerator circuit 236 or addresses in data memory 316 storing results of operations that have been executed so far from a beginning of the program. In response to one or more probe signals 416, accelerator circuit 236 may provide one or more state signals 418 to debugging circuit 402 with information about the state of accelerator circuit 236 (e.g., states of specific register files in accelerator circuit 236 or addresses in data memory 316). Accelerator circuit 236 may provide one or more state signals 418 to debugging circuit 402 via port 414 or some other port of accelerator circuit 236. After processing one or more state signals 418, debugging circuit 402 may provide information to, e.g., a compiler or some other programming tool of accelerator circuit 236 (not shown in FIG. 4) for correcting one or more errors that were found in one or more instruction packets of the program stored in instruction memory 304 that have been executed so far. Once the one or more errors are corrected, accelerator circuit 236 may be configured (e.g., via program counter control circuit 302) to run instruction packets of the program from the beginning of the program, with the same or different conditions for triggering a breakpoint in the program for debugging of accelerator circuit 236.

Example Processes at Accelerator Circuit

Figure 5:
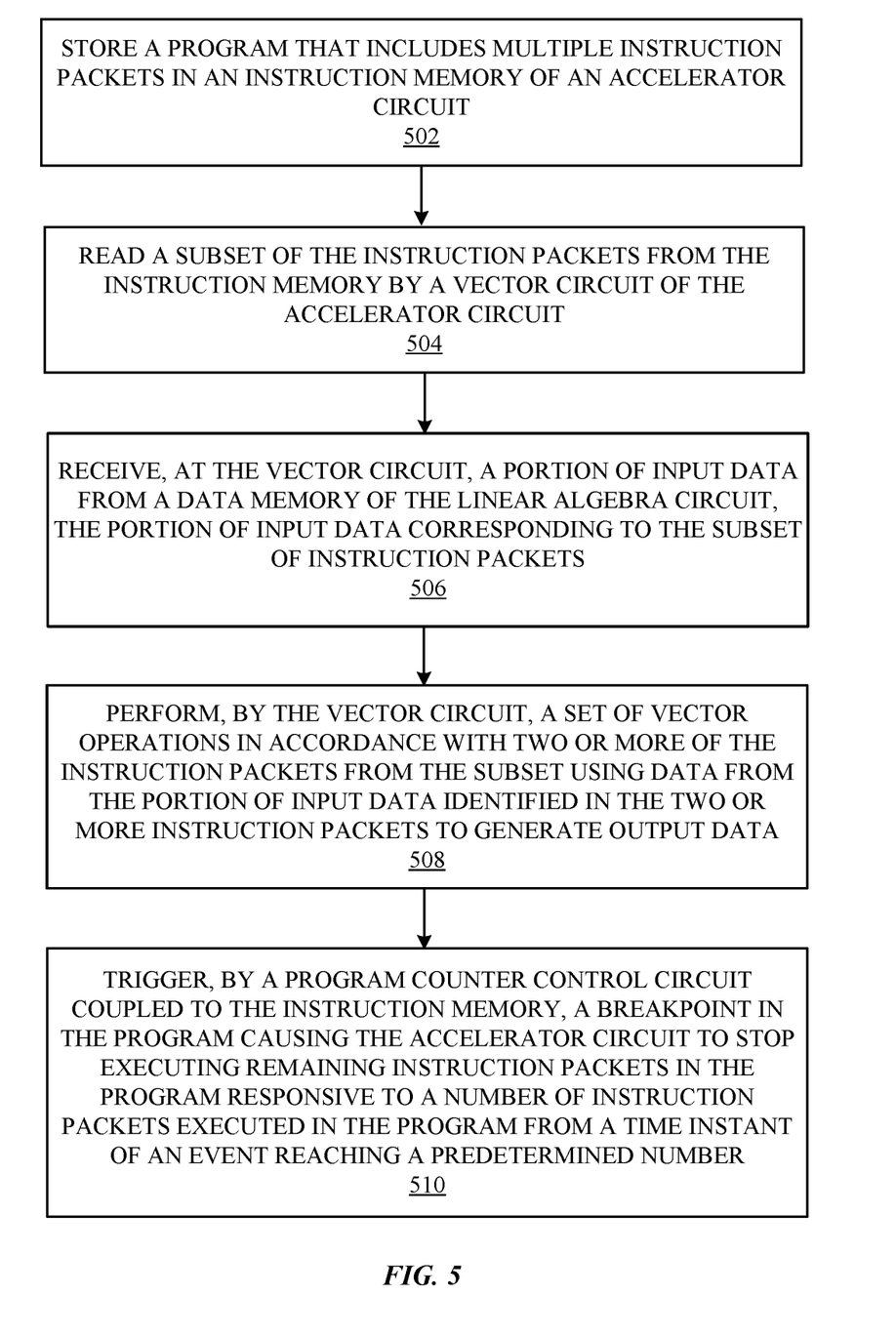
FIG. 5 is a flowchart illustrating a method of triggering a breakpoint in a program executed at an accelerator circuit for debugging of the accelerator circuit, according to one embodiment.

FIG. 5 is a flowchart illustrating a method of triggering a breakpoint in a program executed at an accelerator circuit (e.g., linear algebra accelerator circuit) for debugging of the accelerator circuit, according to one embodiment. The accelerator circuit stores 502 a program that includes multiple instruction packets in an instruction memory of the accelerator circuit. Each of the instruction packets may include a respective packet of instructions executed in parallel at the accelerator circuit. The accelerator circuit reads 504 a subset of the instruction packets from the instruction memory by a vector circuit of the accelerator circuit coupled to the instruction memory.

The accelerator circuit receives 506, at the vector circuit, a portion of the input data from a data memory of the linear algebra circuit, the portion of input data corresponding to the subset of instruction packets. The accelerator circuit performs 508, by the vector circuit, a set of vector operations in accordance with two or more of the instruction packets from the subset using data from the received portion of input data identified in the two or more instruction packets to generate output data.

The accelerator circuit triggers 510, by a program counter control circuit of the accelerator circuit coupled to the instruction memory, a breakpoint in the program causing the accelerator circuit to stop executing remaining instruction packets in the program following the two or more instruction packets responsive to a number of instruction packets executed in the program from a time instant of an event at the accelerator circuit reaching a predetermined number. Debugging of a state of the accelerator circuit may be performed by, e.g., a debugging circuit coupled to the accelerator circuit responsive to triggering of the breakpoint.

Embodiments of the process as described above with reference to FIG. 5 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An accelerator circuit comprising:
an instruction memory storing a program that includes a plurality of instruction packets;
a data memory storing input data;
a vector circuit coupled to the instruction memory and the data memory, the vector circuit configured to:
read a subset of the plurality of instruction packets from the instruction memory,
receive a portion of the input data from the data memory corresponding to the subset of the plurality of instruction packets, and
execute a set of vector operations in accordance with two or more of the plurality of instruction packets from the subset using data from the received portion of the input data identified in the two or more of the plurality of instruction packets to generate output data; and
a program counter control circuit coupled to the instruction memory, the program counter control circuit configured to trigger a breakpoint in the program causing the accelerator circuit to stop executing remaining instruction packets in the program following the two or more of the plurality of instruction packets responsive to a number of instruction packets executed in the program from a time instant of an event reaching a predetermined number.

2. The accelerator circuit of claim 1, wherein each of the plurality of instruction packets comprises a respective plurality of instructions executed in parallel at the accelerator circuit.

3. The accelerator circuit of claim 1, wherein debugging of a state of the accelerator circuit is performed by a debugging circuit coupled to the accelerator circuit responsive to the triggering of the breakpoint.

4. The accelerator circuit of claim 3, wherein the state of the accelerator circuit is evaluated via an advanced extensible interface (AXI) slave port of the accelerator circuit.

5. The accelerator circuit of claim 1, wherein the program counter control circuit is further configured to set the predetermined number of instruction packets in one or more registers of the program counter control circuit.

6. The accelerator circuit of claim 1, wherein the event comprises a software reset of the accelerator circuit.

7. The accelerator circuit of claim 6, wherein the program counter control circuit is further configured to trigger the breakpoint responsive to the number of instruction packets executed in the program after the software reset of the accelerator circuit being equal to a number of instruction packets in a packet limit register of the program counter control circuit.

8. The accelerator circuit of claim 1, wherein the event comprises resetting a packet count register of the program counter control circuit.

9. The accelerator circuit of claim 8, wherein the program counter control circuit is further configured to trigger the breakpoint responsive to the number of instruction packets executed in the program after the resetting of the packet count register being equal to a number of instruction packets in a packet limit register of the program counter control circuit.

10. The accelerator circuit of claim 1, wherein the accelerator circuit is integrated into an image signal processor circuit or a neural processor circuit.

11. A method of operating an accelerator circuit, comprising:
  storing a program that includes a plurality of instruction packets in an instruction memory of the accelerator circuit;
  reading a subset of the plurality of instruction packets from the instruction memory by a vector circuit of the accelerator circuit coupled to the instruction memory;
  receiving, at the vector circuit, a portion of input data from a data memory of the accelerator circuit, the portion of the input data corresponding to the subset of the plurality of instruction packets;
  executing, by the vector circuit, a set of vector operations in accordance with two or more of the plurality of instruction packets from the subset using data from the received portion of the input data identified in the two or more of the plurality of instruction packets to generate output data; and
  triggering, by a program counter control circuit of the accelerator circuit coupled to the instruction memory, a breakpoint in the program causing the accelerator circuit to stop executing remaining instruction packets in the program following the two or more of the plurality of instruction packets responsive to a number of instruction packets executed in the program from a time instant of an event reaching a predetermined number.

12. The method of claim 11, wherein each of the plurality of instruction packets comprises a respective plurality of instructions executed in parallel at the accelerator circuit.

13. The method of claim 11, further comprising:
  performing debugging of a state of the accelerator circuit by a debugging circuit coupled to the accelerator circuit responsive to the triggering of the breakpoint.

14. The method of claim 13, further comprising:
  evaluating the state of the accelerator circuit via an advanced extensible interface (AXI) slave port of the accelerator circuit.

15. The method of claim 11, wherein the event comprises a software reset of the accelerator circuit.

16. The method of claim 15, further comprising:
  triggering, by the program counter control circuit, the breakpoint responsive to the number of instruction packets executed in the program after the software reset of the accelerator circuit being equal to a number of instruction packets in a packet limit register of the program counter control circuit.

17. The method of claim 11, wherein the event comprises resetting of a packet count register of the program counter control circuit.

18. The method of claim 17, further comprising:
  triggering, by the program counter control circuit, the breakpoint responsive to the number of instruction packets executed in the program after the resetting of the packet count register being equal to a number of instruction packets in a packet limit register of the program counter control circuit.

19. An electronic device, comprising:
  a system memory storing input data; and
  an accelerator circuit coupled to the system memory, the accelerator circuit including:
    a data memory configured to receive and store the input data from the system memory,
    an instruction memory storing a program that includes a plurality of instruction packets,
    a vector circuit coupled to the instruction memory and the data memory, the vector circuit configured to:
      read at least a subset of the plurality of instruction packets from the instruction memory,
      receive at least a portion of the input data from the data memory corresponding to the subset of plurality of instruction packets, and
      execute a set of vector operations in accordance with two or more of the plurality of instruction packets from the subset using data from the received portion of the input data identified in the two or more of the plurality of instruction packets to generate output data, and
    a program counter control circuit coupled to the instruction memory, the program counter control circuit configured to trigger a breakpoint in the program causing the accelerator circuit to stop executing remaining instruction packets in the program following the two or more of the plurality of instruction packets responsive to a number of instruction packets executed in the program from a time instant of an event reaching a predetermined number.

20. The electronic device of claim 19, wherein the program counter control circuit is further configured to:
  trigger the breakpoint responsive to the number of instruction packets executed in the program after a software reset of the accelerator circuit or resetting of a packet count register of the program counter control circuit being equal to a number of instruction packets in a packet limit register of the program counter control circuit, and
  each of the plurality of instruction packets comprises a respective plurality of instructions executed in parallel at the accelerator circuit.

* * * * *

UNITED STATES PATENT AND TRADEMARK OFFICE
CERTIFICATE OF CORRECTION

PATENT NO. : 11,914,500 B2
APPLICATION NO. : 17/591888
DATED : February 27, 2024
INVENTOR(S) : Fishel et al.

It is certified that error appears in the above-identified patent and that said Letters Patent is hereby corrected as shown below:

In the Specification

In Column 3, Line 19, delete "(FIG." and insert -- (FIG.) --, therefor.

Signed and Sealed this
Second Day of April, 2024

Katherine Kelly Vidal
*Director of the United States Patent and Trademark Office*